(12) United States Patent
Rosenzweig et al.

(10) Patent No.: US 9,747,251 B2
(45) Date of Patent: Aug. 29, 2017

(54) VIDEO ENCODING AND DECODING USING PARALLEL PROCESSORS

(75) Inventors: Jesse J. Rosenzweig, Portland, OR (US); Brian Gregory Lewis, Portland, OR (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 1247 days.

(21) Appl. No.: 13/314,013

(22) Filed: Dec. 7, 2011

(65) Prior Publication Data

US 2012/0093234 A1    Apr. 19, 2012

Related U.S. Application Data

(63) Continuation of application No. 12/058,636, filed on Mar. 28, 2008, now Pat. No. 8,121,197.

(60) Provisional application No. 61/002,972, filed on Nov. 13, 2007.

(51) Int. Cl.
| | |
|---|---|
| *H04N 19/44* | (2014.01) |
| *G06F 15/80* | (2006.01) |
| *H04N 19/176* | (2014.01) |
| *H04N 19/91* | (2014.01) |
| *H04N 19/174* | (2014.01) |
| *H04N 19/436* | (2014.01) |

(52) U.S. Cl.
CPC ....... *G06F 15/8007* (2013.01); *H04N 19/174* (2014.11); *H04N 19/176* (2014.11); *H04N 19/436* (2014.11); *H04N 19/44* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 5,239,654 A | * | 8/1993 | Ing-Simmons ..... G06F 9/30014 712/20 |
| 5,280,349 A | | 1/1994 | Wang |
| 5,414,468 A | | 5/1995 | Lee |

(Continued)

FOREIGN PATENT DOCUMENTS

| | | | |
|---|---|---|---|
| JP | 2004140473 A | 5/2004 |
| JP | 2007174569 A | 7/2007 |

(Continued)

OTHER PUBLICATIONS

Thinh M. Le et al. SMID Processor Arrays for Image and Video Processing: A Review, Multimedia Hardware Architectures, 1998, vol. 3311 of SPIE Proceedings (http://www.doe.carleton.ca~thinh/./papers/mha98/array98.ps).

(Continued)

*Primary Examiner* — William C Vaughn, Jr.
*Assistant Examiner* — Jerry Jean Baptiste
(74) *Attorney, Agent, or Firm* — Hogen Lovells US LLP

(57) ABSTRACT

A method is disclosed for the decoding and encoding of a block-based video bit-stream such as MPEG2, H.264-AVC, VC1, or VP6 using a system containing one or more high speed sequential processors, a homogenous array of software configurable general purpose parallel processors, and a high speed memory system to transfer data between processors or processor sets. This disclosure includes a method for load balancing between the two sets of processors.

20 Claims, 2 Drawing Sheets

Multi-processor video decompression/compression system

(56) References Cited

U.S. PATENT DOCUMENTS

| | | | |
|---|---|---|---|
| 5,557,332 A | 9/1996 | Koyanagi | |
| 5,565,920 A | 10/1996 | Lee | |
| 5,675,331 A * | 10/1997 | Watanabe | H03M 7/425 341/67 |
| 5,689,677 A * | 11/1997 | MacMillan | G06F 9/3879 365/222 |
| 5,699,460 A | 12/1997 | Kopet | |
| 5,701,164 A | 12/1997 | Kato | |
| 5,963,260 A | 10/1999 | Bakhmutsky | |
| 6,058,143 A | 5/2000 | Golin | |
| 6,434,196 B1 | 8/2002 | Sethuraman | |
| 6,504,872 B1 | 1/2003 | Fimoff | |
| 6,577,767 B2 | 6/2003 | Lee | |
| 6,587,590 B1 | 7/2003 | Pan | |
| 6,771,704 B1 | 8/2004 | Hannah | |
| 6,870,883 B2 | 3/2005 | Iwata | |
| 6,888,477 B2 | 5/2005 | Lai | |
| 6,952,211 B1 | 10/2005 | Cote | |
| 7,274,368 B1 * | 9/2007 | Keslin | G06F 9/5044 345/522 |
| 7,339,993 B1 | 3/2008 | Brooks | |
| 7,376,590 B2 | 5/2008 | Lee | |
| 7,634,776 B2 | 12/2009 | Parameswaran | |
| 7,646,810 B2 | 1/2010 | Tourapis | |
| 8,121,197 B2 | 2/2012 | Rosenzweig | |
| 8,184,715 B1 | 5/2012 | Rosenzweig | |
| 8,250,618 B2 | 8/2012 | Rosenzweig | |
| 8,437,407 B2 | 5/2013 | Rosenzweig | |
| 2001/0047517 A1 | 11/2001 | Christopoulos | |
| 2002/0031184 A1 * | 3/2002 | Iwata | H04N 19/61 375/240.23 |
| 2002/0064314 A1 | 5/2002 | Comaniciu | |
| 2002/0136298 A1 | 9/2002 | Anantharamu | |
| 2002/0157112 A1 | 10/2002 | Kuhn | |
| 2003/0028643 A1 | 2/2003 | Jabri | |
| 2003/0123748 A1 | 7/2003 | Sebot | |
| 2004/0076333 A1 | 4/2004 | Zhang | |
| 2004/0101056 A1 | 5/2004 | Wong | |
| 2004/0161035 A1 | 8/2004 | Wedi | |
| 2004/0181806 A1 | 9/2004 | Sullivan | |
| 2004/0213345 A1 | 10/2004 | Holcomb | |
| 2004/0218673 A1 | 11/2004 | Wang | |
| 2004/0252901 A1 | 12/2004 | Klein Gunnewick | |
| 2005/0019000 A1 | 1/2005 | Lim | |
| 2005/0062746 A1 * | 3/2005 | Kataoka | H04N 19/61 345/505 |
| 2005/0091696 A1 | 4/2005 | Wolfe | |
| 2005/0134735 A1 | 6/2005 | Swartz | |
| 2005/0147033 A1 | 7/2005 | Chin | |
| 2005/0160471 A1 | 7/2005 | Cohen | |
| 2005/0262510 A1 | 11/2005 | Parameswaran | |
| 2006/0018378 A1 | 1/2006 | Piccinelli | |
| 2006/0056513 A1 | 3/2006 | Shen | |
| 2006/0083308 A1 | 4/2006 | Schwarz | |
| 2006/0093042 A1 | 5/2006 | Kashima | |
| 2006/0095944 A1 | 5/2006 | Demircin | |
| 2006/0114989 A1 | 6/2006 | Panda | |
| 2006/0126667 A1 | 6/2006 | Smith | |
| 2006/0153299 A1 | 7/2006 | Iwata | |
| 2006/0193388 A1 | 8/2006 | Woods | |
| 2006/0268991 A1 | 11/2006 | Segall | |
| 2007/0025628 A1 | 2/2007 | Sekiguchi | |
| 2007/0033494 A1 | 2/2007 | Wenger | |
| 2007/0053436 A1 | 3/2007 | Van Eggelen | |
| 2007/0086528 A1 | 4/2007 | Mauchly | |
| 2007/0091815 A1 | 4/2007 | Tinnakornsrisuphap | |
| 2007/0098070 A1 | 5/2007 | Saigo | |
| 2007/0223580 A1 | 9/2007 | Ye | |
| 2007/0285285 A1 | 12/2007 | Puri | |
| 2007/0291038 A1 | 12/2007 | Herz | |
| 2008/0025412 A1 | 1/2008 | Lee | |
| 2008/0063082 A1 | 3/2008 | Watanabe | |
| 2008/0084927 A1 | 4/2008 | Rosenzweig | |
| 2008/0123750 A1 | 5/2008 | Bronstein | |
| 2008/0126278 A1 | 5/2008 | Bronstein | |
| 2008/0232464 A1 | 9/2008 | Tahara | |
| 2009/0034856 A1 | 2/2009 | Moriya | |
| 2009/0092326 A1 | 4/2009 | Fukuhara | |
| 2009/0125538 A1 | 5/2009 | Rosenzweig | |
| 2009/0290635 A1 | 11/2009 | Kim | |
| 2012/0219068 A1 | 8/2012 | Rosenzweig | |

FOREIGN PATENT DOCUMENTS

| | | |
|---|---|---|
| WO | WO 03/036980 A1 | 5/2003 |
| WO | WO 2004/010670 A1 | 1/2004 |

OTHER PUBLICATIONS

Wedi, "New Results on Adaptive Interpolation Filter," May 10, 2002.

Tambankar et al., "An Overview of H.264/MPEG-4 Part 10," Jul. 2, 2003.

Wedi, "Advanced Motion Compensated Prediction Methods," Oct. 18, 2003.

Blaszak et al., "Scalable AVC Codec," Mar. 6, 2004.

Schwarz et al., "SVC Core Experiment 2.1: Inter-Layer Prediction of motion and Residual Data," Jul. 14, 2004.

Teng et al., "Design and Evaluation of mProducer: a Mobile Authoring Tool for Personal Experience Computing": Oct. 27-29, 2004; 8 pages.

Stolowitz Ford Cowger LLP List of Related Cases dated Dec. 23, 2011.

* cited by examiner

Multi-processor video decompression/compression system

Parallel variable length decode of encoded video data using Sequential Processors Array

VIDEO ENCODING AND DECODING USING PARALLEL PROCESSORS

RELATED APPLICATIONS

This application is a continuation of U.S. Non-Provisional Ser. No. 12/058,636 filed Mar. 28, 2008, entitled "VIDEO ENCODING AND DECODING USING PARALLEL PROCESSORS", which claims priority from U.S. Provisional application No. 61/002,972 filed Nov. 13, 2007, entitled "METHOD FOR DECODING OR ENCODING VIDEO USING ONE OR MORE SEQUENTIAL PROCESSORS AND A GROUP OR GROUPS OF PARALLEL SIMD PROCESSORS AND LOAD BALANCING TO ACHIEVE OPTIMAL EFFICIENCY", both of which are incorporated by reference herein in their entirety.

COPYRIGHT NOTICE

© 2007-2012 Elemental Technologies, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for decoding or encoding video data using one or more sequential processors together with a group or groups of parallel general purpose SIMD processors.

BACKGROUND OF THE INVENTION

Encoding and decoding systems and methods for MPEG and other block-based video bit-stream data are now widely known. The fundamentals are well summarized in U.S. Pat. No. 6,870,883 ("Iwata"), incorporated herein by this reference. Iwata discloses a three-processor system and method for video encoding and decoding, to achieve a modicum of parallelism and improved performance over a strictly sequential solution.

Block based video compression standards such as MPEG2, H.264, and VC1 are difficult to decode or encode in parallel using parallel processors due to the interdependency of bits or blocks of the video frame. It is also difficult to maximize the performance by keeping all processors as busy as possible due to differing requirements of the processors.

One property of video is that for any given block of pixels (e.g. macroblock) in the video frame, there is a high correlation to neighboring blocks. Video compression technologies take advantage of this through the use of prediction. When the video is encoded, the encoder predicts block properties based on neighboring blocks and then encodes the difference (residual) from the prediction. The video decoder computes the same prediction and adds the residual to the prediction to decompress the video. Since only residuals to the predictions are sent, the amount of information sent between the encoder and the decoder is compressed. One drawback to having block properties predicted based off neighboring blocks is that if a neighboring block contains an error, for example due to interference during a broadcast, then all subsequent blocks will also contain an error causing an entire frame of video to be corrupted. For this reason, these video compression standards contain a notion of a slice.

A "slice" of video data contains a set of blocks that can be decoded without any other neighboring block information (from outside the slice). At each slice, the predictors are reset, trading off compression efficiency for error resilience. The majority of encoded MPEG2 content, for example, uses one slice per line of blocks. If an error is introduced in any given block, the system can recover on the next line of blocks.

Two other properties of video that allow it to be compressed are these: high frequency information can be discarded without the human vision system detecting a noticeable change in the results; and, motion tends to be localized to certain areas of the picture. Video compression standards take advantage of these two properties by a method called quantization and motion estimation/motion compensation, respectively.

Finally, to further compress the video data, a lossless variable length encoding scheme is used in video compression technologies. These methods may even use a context adaptive algorithm causing further dependency on data previously encoded or decoded in the data stream.

Some known solutions utilize multiple sequential processors or arrays of processors connected by a network such as Ethernet or high speed memory interface. These solutions suffer in efficiency from insufficient number of processors, and memory bandwidth/latency in sending data to all the processors.

Other proposals for parallelizing video decoding and encoding have been proposed such as that disclosed in U.S. Pat. No. 6,870,883 which describes a system for decoding video using multiple processors. That system requires the computationally expensive ability to transfer data to and from processors at each macroblock.

The need remains for improvements in methods and systems for video data processing to improve throughput while maintaining video quality and controlling costs.

SUMMARY OF THE INVENTION

In general, the present disclosure concerns improvements in video encoding/decoding technology. In one embodiment, improvements can be achieved by using two different processor systems, namely a Sequential Processor Array ("SPA") and a Parallel Processor Array ("PPA"). The SPA and PPA encode/decode a video stream in a predefined, coordinated manner. In one illustrative system, in a decoder, a sequential processor array is provided comprising at least one general purpose sequential processor and arranged to receive a video data input stream; and a general purpose parallel processor array is provided. A data bus interconnects the sequential processor array and the parallel processor array. A first memory is coupled to the sequential processor array to store SPA program instructions, Macroblock coefficient data and Macroblock metadata produced by the SPA from incoming video data. A second memory is coupled to the parallel processor array and is arranged for storing PPA program instructions and macroblock coefficient data, macroblock metadata, reference frame data and output video frame data.

Additional aspects and advantages of this invention will be apparent from the following detailed description of preferred embodiments, which proceeds with reference to the accompanying drawings.

DETAILED DESCRIPTION OF PREFERRED EMBODIMENTS

With the advent of general purpose multi-core processors from Intel or AMD which have either 2, 4 or 8 processors and massively multi-processor systems such as NVIDIA's G80 GPU which, as of this writing, contains up to 128 SIMD (single instruction, multiple data) processors, a relatively inexpensive commodity desktop PC can provide a massive amount of processing power. What is needed, and is described herein, are methods for utilizing systems that include sequential and parallel processors so as to greatly enhance the speed and efficiency of decoding and decompression of block-based video data. The decompressed video frames can then be displayed on a computer or television screen, or used in further video processing such as image enhancement, scaling, or encoding for re-transmission.

Figure 1:
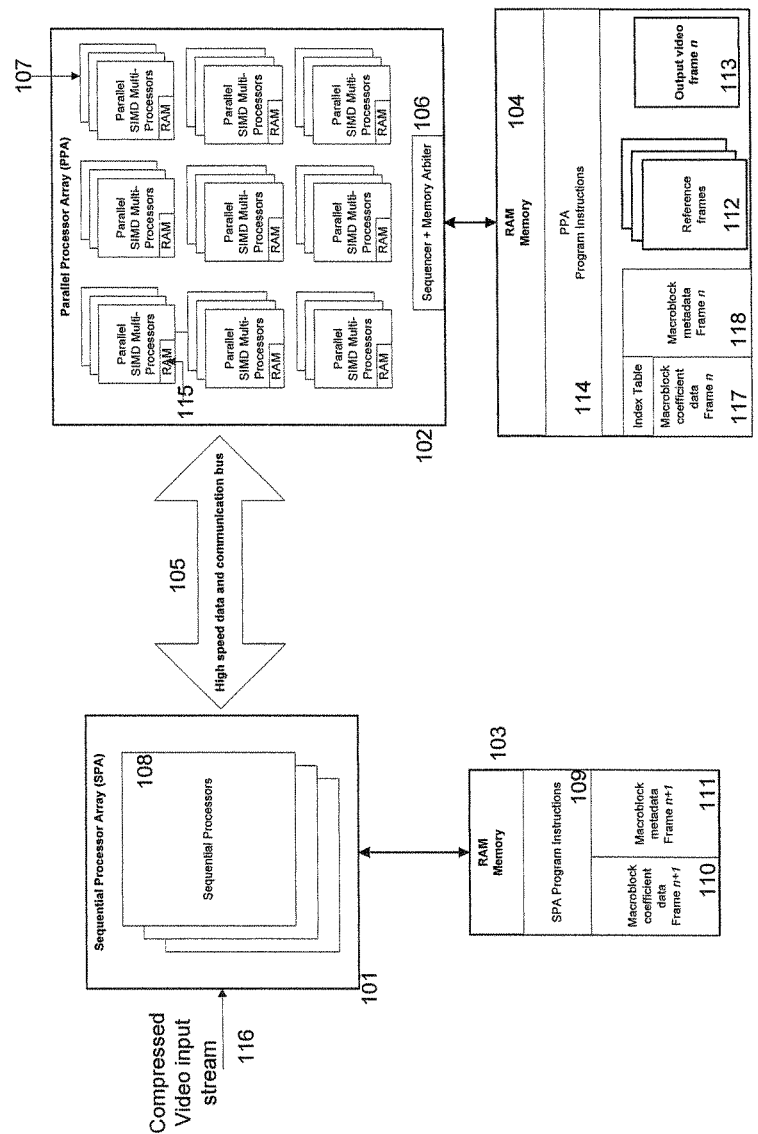
FIG. 1 is a simplified block diagram illustrating a multi-processor video decompression/compression system architecture consistent with the present invention.

Our invention in various embodiments takes advantage of slices and other independent portions of the video to greatly increase the coding speed and efficiency. In one presently preferred embodiment, our methods can be used in a system of the general type illustrated in FIG. 1, containing a sequential processor array ("SPA" 101) and a Parallel Processor Array ("PPA" 102). The SPA contains one or more high performance general purpose sequential processing units that are designed to execute sequential instructions on sequential data. The PPA contains one or more groups of homogeneous general purpose SIMD multiprocessors 107 that are designed to operate on highly parallel problems where many processors can work in parallel. The SPA and PPA each has access to one or more physical RAMs (Random Access Memory) 103 and 104, respectively, and are connected together by a high speed bi-directional data and communication bus 105.

Each multiprocessor 107 contains one or more SIMD (Single Instruction Multiple Data) processors, and also contains a memory cache (illustrated as RAM but may be other types of cache) 115 allowing fast access and communication between each SIMD processor in the multiprocessor. There is also, in the illustrated embodiment, a random access memory (RAM 104) shared by all multiprocessors in the array 102, that store the video frames, macroblock coefficient data, macroblock metadata, and multiprocessor instructions. There is a PPA sequencer and memory arbiter 106 to automatically and efficiently select processors to execute a set of instructions 114. Each multiprocessor can process batches of instructions and one batch is executed after the other. The scheduler selects batches of instructions for each multiprocessor. If, and when, a multi-processor is instructed to wait for memory or a synchronization event, the scheduler will swap in new instructions to execute on that processor.

Decode Method

One aspect of the present invention involves using two methods or processes in parallel to efficiently apply processing resources to decode or encode block-based video data. We use the term "parallel" to refer to processes that generally run concurrently, in a coordinated fashion. We do not use the term to require a strict step by step, or clock by clock parallelism. The following description is for decoding, but it can be applied to encoding in a similar manner as further explained below.

The first of the pair of methods we will call Parallel Variable Length Decode or "PVLD." As the name implies, this method applies parallel processing to the variable-length decoding aspect of video decoding. It decompresses a video frame of a variable length inter-block dependent encoded stream 116, and produces an independent variable length macroblock coefficient data buffer 110 and a fixed size macroblock metadata buffer 111. This data, for one frame in a preferred embodiment, is then copied to the PPA's RAM memory 104 through the high speed communication bus 105. In an alternative embodiment, a memory address can be sent to the PPA 107, for example in the case of a single shared RAM device (not shown).

The second process of the pair we will call Parallel Block Decode or "PBD." The PBD process decompresses each macroblock by decoding the run-length compressed coefficient data using the metadata and using stored reference frames 112. The output of this method is the desired output video frame 113. As soon as the data is copied to the PPA, the SPA can start on the next frame, thus the first method PVLD in a preferred embodiment is always decompressing one frame ahead of the second method, the PBD. Since both methods are running in parallel and both of these processes make use of many processors (in array 101 and array 102, respectively, the speed and efficiency of decoding an entire video stream is greatly improved compared to prior solutions.

Referring again to FIG. 1, the coefficient data buffer (110 and 117) contains a run length encoded version of the frequency coefficients representing the residual data from the prediction, and the metadata buffer contains other properties of each macroblock that instruct the multiprocessors in the PPA how to decode each macroblock. Buffer 110 contains the coefficient data, or is accumulating that data, for a Frame "n+1" when the PPA buffer 117 is working on decoding the coefficient data from the last (i.e., the next preceding) Frame n. As noted, the SPA starts on the next frame of data as soon as it stores a completed frame of coefficient data in the buffer 117 for the PPA to conduct PBD. In this embodiment, there is no harm if the block decode in the PPA temporarily falls behind, as the next frame data can wait in the buffer. However, it need not wait for a full frame of data to begin processing macroblocks.

Processing Slices of Macroblock Data

As discussed in the background section, slices can be decoded independently of other slices. Slices also contain blocks that are dependent on other blocks in the slice and are best decoded sequentially; therefore, in a preferred embodiment, each slice is decoded using a sequential processor 108, but more than one slice can be decoded in parallel using a group of sequential processors 101. Each sequential processor 108 in the SPA decodes an assigned slice, and outputs the independent coefficients and metadata into another array for use in the second process (PBD). If there are not enough sequential processors for all slices of a frame, slices may be assigned, for example in a round-robin fashion, until all slices are decoded.

Figure 2:
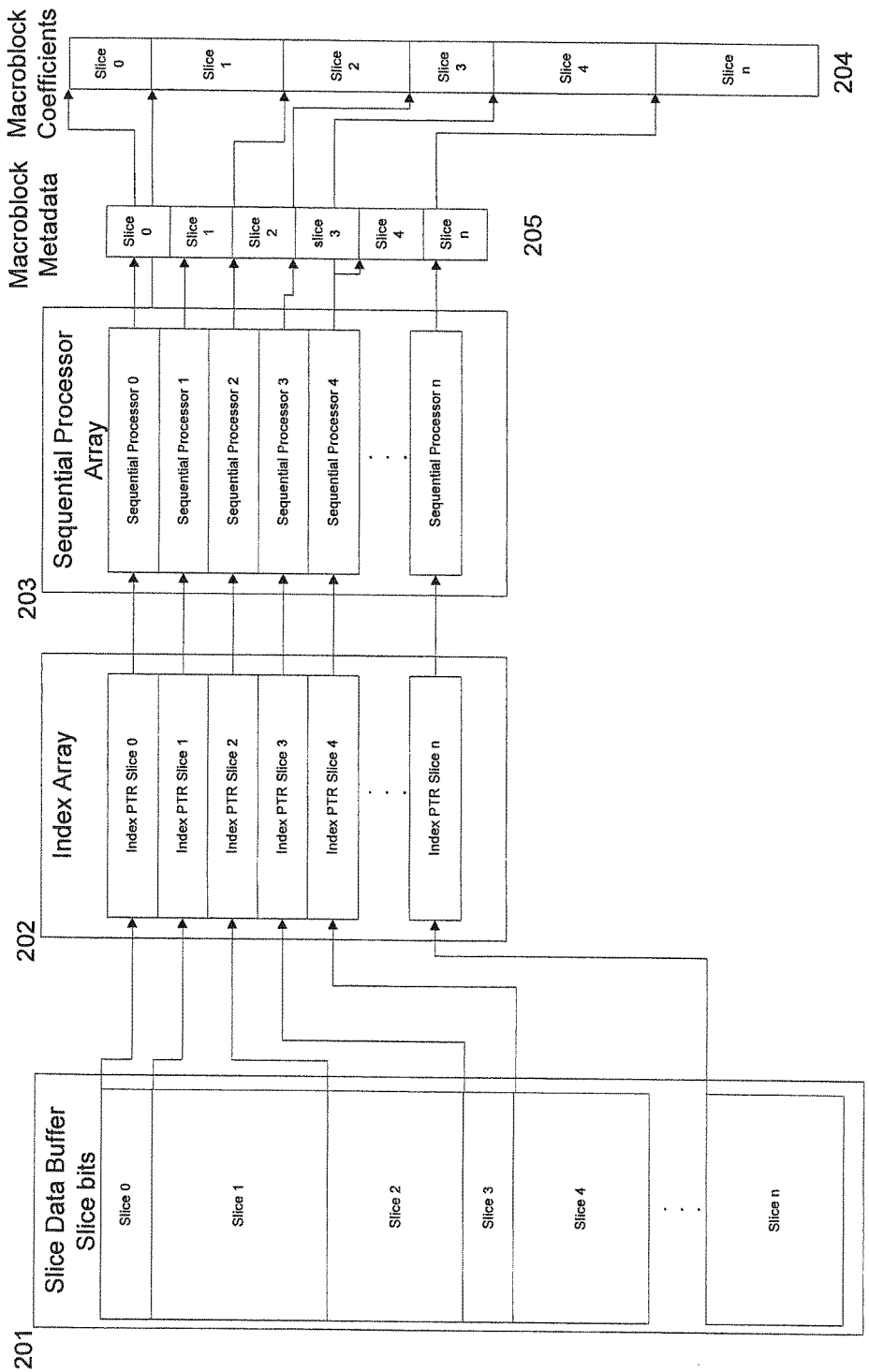
FIG. 2 is a simplified flow diagram illustrating a method of parallel variable length decode of encoded video data using an array of general purpose sequential processors.

Slices of data are variable in byte length due to the nature of the variable length encoding as well as the amount of compression due to prediction for each slice, however. To accommodate this aspect, a process is illustrated in FIG. 2 to pre-process the data in such a way that a frame of video can be decoded in parallel using multiple sequential processors. 201 shows the variable sized slices packed in a buffer. This buffer contains the encoded bits from the video stream with all slices packed together. The data is pre-processed by finding the point in the buffer where each slice begins and the pointers for each slice are stored in an index array shown in 202. This index array is then read by the each processor in the SPA (203) to find the location of the slice that each processor is responsible for decoding. Once the set of macroblocks in each SPA processor's array has been VLC decoded to coefficients and meta data, the resulting (RLE compressed) coefficients and metadata for each block in a slice is stored in an array (204 and 205 respectively and 117 and 118 respectively). Another index table is used to tell each processor in the PPA where each macroblock is located in the coefficient buffer (204). In the case of this invention, the index table is stored at the top of the coefficient buffer for convenience. Each processor in the PPA then reads the address offset for the macroblock data that it is responsible for decoding from this table as shown in (117).

Once all the slices have been decoded, the decompressed slice data is sent to the PPA for the PBD and decoding of the next frame of slices can be started on the SPA. Since each macroblock in the PBD is independent of other macroblocks, many more processors can be applied to decompressing all of the blocks in parallel.

Each processor in a multiprocessor communicates through a RAM that is local to the group of processors. Each processor's function depends on the macroblock decoding phases.

In some cases, such as high bit rate video decoding or encoding, some of the sequential decoding or encoding in the PVLD could be offloaded to the PPA. In some embodiments, where this capability is implemented, the decision depends on which phase of the codec is the bottleneck in the system. A methodology for making this determination for load balancing is described in the next section.

Load Balancing to Optimize Throughput

To properly load balance the system using the PPA and the SPA the system must calculate the theoretical performance (for example, in frames per second) of the different processor load distributions using various inputs and some pre-calibrated constants. The following is a sample calculation.
Let:
Ns=# of processors for SPA
Np=# of processors for PPA
Cs=clock rate of one of the processors in either the SPA and PPA (assume all have the same clock rate)
Cp=clock rate of one of the processors in the PPA (assume all have the same clock rate)
Cts=available clock rate per array of SPA processors=Cs*MIN(Ns, # slices in the video)
Ctp=available clock rate per array of PPA processors=Cp*MIN(Np, # slices in the video)
B=bits per frame of a video stream (initial value set to avg bitrate/FPS and then continuously refined by analyzing previously processed frames and frame type)
P=total pixels in video frame
T=transfer rate of high speed bus
Ks=SPA processor clocks per bit for a given system found experimentally or by calibration, and may be different depending on I, P or B frames
Kp=PPA processor clocks per bit for a given system found experimentally or by calibration, and may be different depending on I, P or B frames
Kpp=PPA processor clocks per pixel for a given system found experimentally or by calibration, and may be different depending on I, P, or B frames.

First, the theoretical time for VLC decode or encode in the SPA and PPA is calculated using this equation: Tvs=B*Ks/Cts
The PPA calculation is this equation.

$$Tvp = B*Kp/Ctp$$

The transfer time is calculated by this equation: Tt=B/T for both the more compressed VLC representation, and the Metadata/Coefficient representation of the frame. B changes depending on the VLC representation or the Metadata/Coefficient representation.

The pixel processing time is calculated by a new K and a new Ct:

$$Ctp = Cp*\text{MIN}(Np, \#\text{Macroblocks in the frame})$$

$$Tpp = P*Kpp/Ctp$$

The total FPS is then defined by:
1/(Tvs+Tt+MAX(Tpp−Tvs,0)) when running the PPA and SPA in parallel or;
1/(Tvp+Tt+Tpp) when offloading the VLC processing to the PPA.

These two values are compared and the proper load balancing is chosen based on the better theoretical performance.

A calculation of this type can be run on every frame and variables B, Ks, Kp, and Kpp can be refined based on actual frame processing times vs calculated. B preferably is constantly updated based on historical values and the frame type (such as I, P or B frames). K may also be adjusted based on the historical values of real vs theoretical performance.

Tables 1, 2 and 3 Below Show Examples of Sample Results

This example shows the difference of processing the VLC decode using the PPA vs the SPA and why decoding the VLC step on the 16 processor PPA can achieve a higher overall performance than a 4 processor SPA despite each PPA having a much smaller clocks/second value and a longer transfer time per frame. Processing the VLC on the PPA achieves a 74 frames per second overall performance where the SPA achieves a 60 frames per second overall performance. In this case, the system would execute the VLC decode on the PPA instead of the SPA. A new clock/bit measurement and clock/pixel measurement may then be calculated to determine how the next frame will be decoded.

TABLE 1

Stream Properties

| | | |
|---|---|---|
| 7.50E+07 | bps | average Bits/sec |
| 30 | FPS | Frames per second |
| 30 | Slic# | # slices |
| 25769803776 | T | transfer rate bits/sec |
| 2.50E+06 | Bv | average VLC encoded bits/frame |
| 8.33E+06 | Br | average RLE encoded bits/frame |
| 1920 | X | Res X |
| 1080 | Y | Res Y |
| 2073600 | | Total pixels |

TABLE 2

| | | SPA | |
|---|---|---|---|
| 4 | Ns | Number of Processors | |
| | Cs | Clock rate per each processor Clocks/second | |
| 2.40E+09 | Ks | clock/bit constant | |
| 9.60E+09 | Ct | Total clock rate for SPA | |
| 1.61E−02 | Tvs | processing time for 1 frame in SPA in seconds | |
| 9.70E−05 | Ttv | Transfer time VLC | |
| 3.23E−04 | Ttr | Transfer time RLE | |
| | FPS if VLC done in SPA | 60.71937 FPS | |

TABLE 3

| | | PPA |
|---|---|---|
| 16 | Ns | Number of Processors |
| 1.50E+09 | Cs | Clock rate per each processor Clocks/second |
| 62 | Kp | clock/bit constant |
| 2.40E+10 | Ct | Total clock rate for PPA |
| 80 | Kx | Clock/pixel constant |
| 6.46E−03 | Tvp | VLC processing time for 1 frame in PPA in seconds |
| 6.91E−03 | Txp | Pixel processing time for 1 frame in PPA in seconds |
| | FPS if VLC done in PPA | 74.25368 FPS |

Encoding Video Data

The encoding of video is accomplished in a similar way, but in reverse. The video frames are first placed in to the PPA's RAM memory 104 through a second file decoding process, or a memory copy from a capture device such as a camera. The PPA then executes various pixel processes of an encoder resulting in coefficients. These processes include Intra and Inter prediction, mode selection, motion estimation, motion compensation, DCT and IDCT, Quantization and inverse Quantization.

The resulting coefficients and metadata is then placed into an array similar to 204 and 205 for further processing by the SPA. The SPA then takes the coefficient and meta data and encodes using a variable length coding process (VLC) resulting in a video stream.

If there are multiple slices in the picture, the SPA can process each slice in parallel resulting in higher overall performance. It will be obvious to those having skill in the art that many changes may be made to the details of the above-described embodiments without departing from the underlying principles of the invention. The scope of the present invention should, therefore, be determined only by the following claims.

The invention claimed is:

1. A system for decompressing a compressed video data stream, the system comprising:
 a sequential processor array comprising at least one sequential processor and arranged to receive a video data input stream, the sequential processor array configured to recover macroblock coefficient data and macroblock metadata from a plurality of portions of the video data input stream;
 a parallel processor array (PPA) comprising a plurality of parallel multi-processors, the PPA configured to process the recovered macroblock coefficient data and macroblock to recover pixels;
 a data bus interconnecting the sequential processor array and the PPA;
 a first RAM memory coupled to the sequential processor array to store the macroblock coefficient data and the macroblock metadata, the macroblock metadata including one or more properties for determining to process a respective macroblock using at least one of a Parallel Variable Length Decode (PVLD) process or a Parallel Block Decode (PBD) process;
 a second RAM memory coupled to the PPA to store pixel data output from the PPA, the data bus configured to transfer the macroblock coefficient data and the macroblock metadata from the first RAM memory to the second RAM memory; and
 an index array including a plurality of pointers corresponding to the plurality of portions of the video data input stream, wherein the sequential processor array processes the video data input stream using the index array.

2. The system of claim 1, wherein the second RAM is arranged for storing PPA program instructions and the macroblock coefficient data, the macroblock metadata, reference frame data, and output video frame data.

3. The system of claim 1, wherein the multi-processors comprise SIMD processors.

4. The system of claim 1, wherein:
 the first RAM and the second RAM are realized in a single shared RAM; and the PPA has access to the shared RAM to read the macroblock coefficient data and the macroblock metadata.

5. The system of claim 1, wherein the PVLD process comprises:
 decompressing a first video frame of the video data input stream;
 assigning a first processing array to the plurality of portions of the video data input stream using the index array;
 producing a first independent variable length coefficient data set responsive to the first video frame;
 producing a first fixed-size metadata data set responsive to the first video frame;
 storing the first independent variable length coefficient data set and the first fixed-size metadata data set in the first RAM memory;
 transferring the first independent variable length coefficient data set and the first fixed-size metadata data set from the first RAM memory to a second RAM memory over a data bus interconnecting the first processing array and a second processing array that is different from the first processing array; and
 decompressing a second video frame of the video data input stream.

6. The system of claim 1, wherein:
 the sequential processor array comprises a single semiconductor integrated circuit; and
 the parallel processor array comprises a second semiconductor integrated circuit.

7. The system of claim 5, wherein the PBD process is executed in parallel with the PVLD process executing on the video data input stream, the PBD process comprising:
 accessing the second RAM memory coupled to the second processing array;
 decompressing, using the second processing array, the respective macroblock of the video data input stream by decoding the first independent variable length coefficient data set using the first fixed-size metadata data set and using at least one previously-stored reference frame: and generating a desired output video frame based on decompressing the respective macroblock, wherein the PBD process is executed on the respective macroblock prior to a complete execution of the PVLD process on the video data input stream.

8. A method for decompressing a variable length interblock dependent compressed video input data stream wherein the video input data stream comprises macroblocks, the method comprising:

determining one or more properties of metadata for a respective macroblock of the video input data stream; and executing a Parallel Variable Length Decode (PVLD) process on the video input data stream using a first processing array coupled to a first RAM memory based at least in part on the one or more properties of the metadata of the respective macroblock, the PVLD process comprising:

decompressing a first video frame of the video input data stream;

assigning the first processing array to a plurality of portions of the first video frame using an index array, the index array including a plurality of pointers corresponding to the plurality of portions;

producing a first independent variable length coefficient data set responsive to the first video frame;

producing a first fixed-size metadata data set responsive to the first video frame;

storing the first independent variable length coefficient data set and the first fixed-size metadata data set in the first RAM memory;

transferring the first independent variable length coefficient data set and the first fixed-size metadata data set from the first RAM memory to a second RAM memory over a data bus interconnecting the first processing array and a second processing array; and decompressing a second video frame of the video input data stream.

9. The method of claim 8, further comprising:

using a central processing unit (CPU) component of a computing device, recovering macroblock coefficient data and the macroblock metadata from the video input data stream;

providing the recovered macroblock coefficient data and the recovered macroblock metadata from the CPU component to a Graphics Processing Unit (GPU) component of the computing device over an internal bus of the computing device; and using the GPU component, processing the recovered macroblock coefficient data and the recovered macroblock metadata from the CPU component to recover pixels.

10. The method of claim 9, wherein providing the recovered macroblock coefficient data and the recovered macroblock metadata from the CPU component to the component of the computing device further comprises transmitting the recovered macroblock coefficient data and the recovered macroblock metadata over a bus that interconnects two separate semiconductor integrated circuits.

11. The method of claim 8, further comprising:

executing a Parallel Block Decode (PBD) process using the second processing array based at least in part on the one or more properties of the metadata for the respective macroblock, the second processing array different from the first processing array and coupled to the second RAM memory, the PBD process executing in parallel with the PVLD process executing on the video input data stream, the PBD process comprising:

decompressing the respective macroblock of the video input data stream by decoding the stored first independent variable length coefficient data set using the stored first fixed-size metadata data set and using at least one previously-stored reference frame, so as to generate a desired output video frame; and commencing execution of the PVLD process on the second frame of video input data stream following completion of said storing of the first video frame to cause the PVLD process to decompress at least one frame ahead of the PBD process.

12. The method of claim 11, wherein the PBD process decodes all of the macroblocks of a current frame concurrently.

13. The method of claim 11, wherein said the first independent variable length coefficient data set and the first fixed-size metadata data set is stored in a shared memory space accessible to an array of multi-processors.

14. The method of claim 11, further comprising:

encoding frequency coefficient data using a selected run length coding;

wherein the frequency coefficient data represents residual data generated from predicting a next macroblock of the video input data stream.

15. The method of claim 11, wherein the first fixed-sized metadata data set contains properties of the respective macroblock that instruct the second processing array for decoding the respective macroblock.

16. The method of claim 15, wherein the properties of the respective macroblock stored in the first fixed-size metadata data set that instruct multi-processors in a parallel processor array (PPA) for decoding the respective macroblock include at least coded block pattern, prediction modes, quantization parameter, and motion vectors.

17. A method for decompressing a variable length interblock dependent encoded video input data stream wherein the variable length inter-block dependent encoded video input data stream comprises macroblocks, the method comprising:

determining one or more properties of metadata for a respective macroblock; and executing a Parallel Variable Length Decode (PVLD) process on the variable length inter-block dependent encoded video input data stream using a first processing array coupled to a first RAM memory based at least in part on the one or more properties of the metadata of the respective macroblock, the PVLD process comprising:

decompressing a first video frame of the variable length inter-block dependent encoded video input data stream;

assigning the first processing array to a plurality of portions of the first frame using an index array, the index array including a plurality of pointers corresponding to the plurality of portions;

producing a first macroblock coefficient data set responsive to the first video frame;

producing a first macroblock metadata data set responsive to the first video frame;

storing the first macroblock coefficient data set and the first macroblock metadata data set in the first RAM memory;

transferring the first macroblock coefficient data set and the first macroblock metadata data set from the first RAM memory to a second RAM memory over a data bus interconnecting the first processing array and a second processing array; and decompressing a second video frame of the variable length inter-block dependent encoded video input data stream.

18. The method of claim 17, further comprising:

executing the PBD process using the second processing array based at least in part on the one or more properties of the metadata of the respective macroblock, the second processing array different than the first processing array and coupled to the second RAM memory, the PBD process executing in parallel with the PVLD process executing on the variable length inter-block dependent encoded video input data stream, the PBD process comprising:

decompressing the macroblocks of a previous frame of the variable length inter-block dependent encoded video input data stream; and executing the PVLD process to decompress at least one frame ahead of the PBD process.

19. The method of claim 17, further comprising:

using a central processing unit (CPU) component of a computing device, recovering the first macroblock coefficient data set and the first macroblock metadata set from the variable length inter-block dependent encoded video input data stream;

providing the recovered macroblock coefficient data set and the recovered macroblock metadata set from the CPU component to a Graphics Processing Unit (GPU); component of the computing device over an internal bus of the computing device; and using the GPU component, processing the recovered macroblock coefficient data set and the recovered macroblock metadata set from the CPU component to recover pixels.

20. The method of claim 19, wherein providing the recovered macroblock coefficient data and the recovered macroblock metadata from the CPU component to the component of the computing device further comprises transmitting the recovered macroblock coefficient data set and the recovered macroblock metadata set over a bus that interconnects two separate semiconductor integrated circuits.

* * * * *